United States Patent
Chang et al.

(10) Patent No.: US 8,059,391 B2
(45) Date of Patent: *Nov. 15, 2011

(54) PORTABLE ELECTRONIC DEVICE

(75) Inventors: Yi-Chieh Chang, Taipei (TW); Hung-Chang Hung, Taipei (TW)

(73) Assignee: Asustek Computer Inc., Taipei (TW)

( * ) Notice: Subject to any disclaimer, the term of this patent is extended or adjusted under 35 U.S.C. 154(b) by 0 days.

This patent is subject to a terminal disclaimer.

(21) Appl. No.: 12/849,126

(22) Filed: Aug. 3, 2010

(65) Prior Publication Data

US 2010/0304803 A1 Dec. 2, 2010

Related U.S. Application Data

(63) Continuation of application No. 12/136,273, filed on Jun. 10, 2008, now Pat. No. 7,791,867.

(30) Foreign Application Priority Data

Jul. 12, 2007 (TW) ............................... 96125437 A

(51) Int. Cl.
*G06F 1/16* (2006.01)
(52) U.S. Cl. ............... 361/679.08; 200/47.26; 340/5.25; 345/531; 455/575.4
(58) Field of Classification Search ............... 455/575.4, 455/411, 422.1, 26.1, 575.1, 569.2; 345/531, 345/98, 2.3, 207; 361/679.56, 679.03, 679.3, 361/679.31, 679.32; 340/5.25, 5.9, 5.82; 280/47.26, 55.14, 47.35

See application file for complete search history.

(56) References Cited

U.S. PATENT DOCUMENTS

| 6,024,390 | A | 2/2000 | Murphy et al. |
|---|---|---|---|
| 6,243,260 | B1 | 6/2001 | Lundgren et al. |
| 6,545,577 | B2 | 4/2003 | Yap |
| 7,209,772 | B2 | 4/2007 | Crisp |
| 7,791,867 | B2 * | 9/2010 | Chang et al. ............ 361/679.08 |
| 2002/0190823 | A1 | 12/2002 | Yap |
| 2005/0009581 | A1 | 1/2005 | Im et al. |
| 2005/0208799 | A1 | 9/2005 | Oda |
| 2009/0168317 | A1 * | 7/2009 | Wang et al. ............ 361/679.09 |
| 2010/0035669 | A1 | 2/2010 | Jang et al. |
| 2010/0048263 | A1 | 2/2010 | Wang et al. |
| 2011/0032668 | A1 * | 2/2011 | Lee ........................ 361/679.01 |

FOREIGN PATENT DOCUMENTS

| CN | 1859451 | 11/2006 |
|---|---|---|
| EP | 0 792 054 | 8/1997 |
| EP | 1 496 674 | 1/2005 |
| EP | 1 760 996 | 3/2007 |

OTHER PUBLICATIONS

English language translation of abstract of CN 1859451 (published Nov. 8, 2006).

* cited by examiner

*Primary Examiner* — Hung Duong
(74) *Attorney, Agent, or Firm* — Thomas, Kayden, Horstemeyer & Risley, LLP

(57) ABSTRACT

A portable electronic device includes a first body, a second body and a sliding positioning device. The first body includes a first operation area and a second operation area. The second body is slidable relative to the first body. The sliding positioning device is connected to the first body and the second body to position the second body at a plurality of locations relative to the first body. The second body hides the second operation area and exposes the first operation area when the second body is located at one of the locations.

19 Claims, 5 Drawing Sheets

PORTABLE ELECTRONIC DEVICE

CROSS-REFERENCE TO RELATED APPLICATION

The present application is a continuation application of U.S. application Ser. No. 12/136,273, filed Jun. 10, 2008, (now U.S. Pat No. 7,791,867), and claims priority to Taiwanese Application Serial Number 96125437, filed Jul. 12, 2007. The entire disclosures of all the above applications are hereby incorporated by reference herein.

BACKGROUND OF THE INVENTION

1. Field of the Invention

The invention relates to a portable electronic device and, more particularly, to a portable electronic device having a sliding keyboard.

2. Description of the Related Art

Along with the development of the wireless communication technology, functions of a portable electronic device such as a personal digital assistant (PDA), a mobile phone are powerful. Taking the mobile phone as an example, besides a voice communication function, a PDA function, an information transfer function (such as receiving or sending an E-mail), a touch control function (such as a touch panel) and so on are integrated into a single mobile phone.

A mobile phone is one type of a conventional multi-function mobile phone. The mobile phone is generally named a sliding cover phone. This type of mobile phone includes a first body and a second body. The first body and the second body can slide relatively to each other. A keyboard area and a plurality of hot keys are disposed on the first body, and a display panel is disposed on the second body. When the second body slides relatively to the first body, and it is superposed at the first body, the second body can hide the keyboard area and the hot keys. On the contrary, when the second body slides away from the first body, the keyboard area and the hot keys are exposed for input operation.

As for the conventional sliding cover phone, the second body is pushed relatively to the first body by one time, and then the second body is positioned further to allow the keyboard area and the hot keys to be completely exposed. The hot keys outside the keyboard area are not necessary to be used every time when a user inputs data. Along with the development tendency that the whole size of a phone needs to be light, slim, short and small, the size of the keyboard area becomes small. A hot key is easy to be pressed by mistake to execute its function while the keyboard area is used to input data, which causes inconvenience. For example, when an E-mail is not finished, if a hot key of sending an E-mail is pressed by mistake, it causes an unnecessary problem.

The display panel of the second body may be a touch display panel. A touch pen is usually used to facilitate input. A conventional mode of fixing the touch pen is that the touch pen is fixed at the outside or inside of a casing in a fastening mode. In use, a user usually needs to take out the touch pen in a digging or picking mode, which is inconvenient.

BRIEF SUMMARY OF THE INVENTION

The objective of the invention is to provide a portable electronic device to solve the problem that a hot key may be pressed by mistake when a conventional portable electronic device is used.

A portable electronic device according to one embodiment of the invention includes a first body, a second body and a sliding positioning device.

The first body includes a first operation area and a second operation area. The first operation area may be a keyboard area, and the second operation area may have a plurality of hot keys. The second body is slidingly disposed on the first body. The sliding positioning device is connected to the first body and the second body to position the second body at a plurality of locations such as a first location, a second location and a third location relative to the first body, respectively. When the second body is located at one of the locations, the second body hides the second operation area and exposes the first operation area. For example, when the second body is located at the first location, the second body hides the first operation area and the second operation area; when the second body is located at the second location, the second body hides the second operation area and exposes the first operation area; when the second body is located at the third location, the second body exposes the first operation area and the second operation area.

In one embodiment, a first magnetic component is disposed in the second body. The first body is has a long guiding groove and a holding hole. The long guiding groove communicates with the holding hole, and it is corresponding to the first magnetic component. The long guiding groove holds the first magnetic component, and the first magnetic component moves in the long guiding groove. The holding hole holds an operation device, such as a touch pen. One end of the operation device is provided with a second magnetic component, and the polarity of the second magnetic is the same with that of the first magnetic component. When the second body is located at the third location, the second magnetic component and the first magnetic component are opposite to each other.

According to the portable electronic device of the invention, advantages of the portable electronic device of the invention are as follows.

The sliding positioning device provides a plurality of positioning locations between the first body and the second body. When the second body is located at one of the locations, the second body hides the second operation area and exposes the first operation area. Since the second operation area are hidden by the second body, the second operation area are prevented from being pressed by mistake when the first operation area is used to input data.

When the second body slides relatively to the first body, it drives the first magnetic component to slide in the long guiding groove to be opposite to the second magnetic component. The repulsive magnetic force between the two magnetic components can automatically eject an operation device, which increases the convenience in use.

BRIEF DESCRIPTION OF THE SEVERAL VIEWS OF THE DRAWINGS

These and other features, aspects, and advantages of the present invention will become better understood with regard to the following description, appended claims, and accompanying drawings.

DETAILED DESCRIPTION OF THE EMBODIMENTS

According to the embodiment of the invention, a portable electronic device is a personal digital assistant (PDA) phone. However, the invention can be applied to other portable electronic devices or products.

Figure 1:
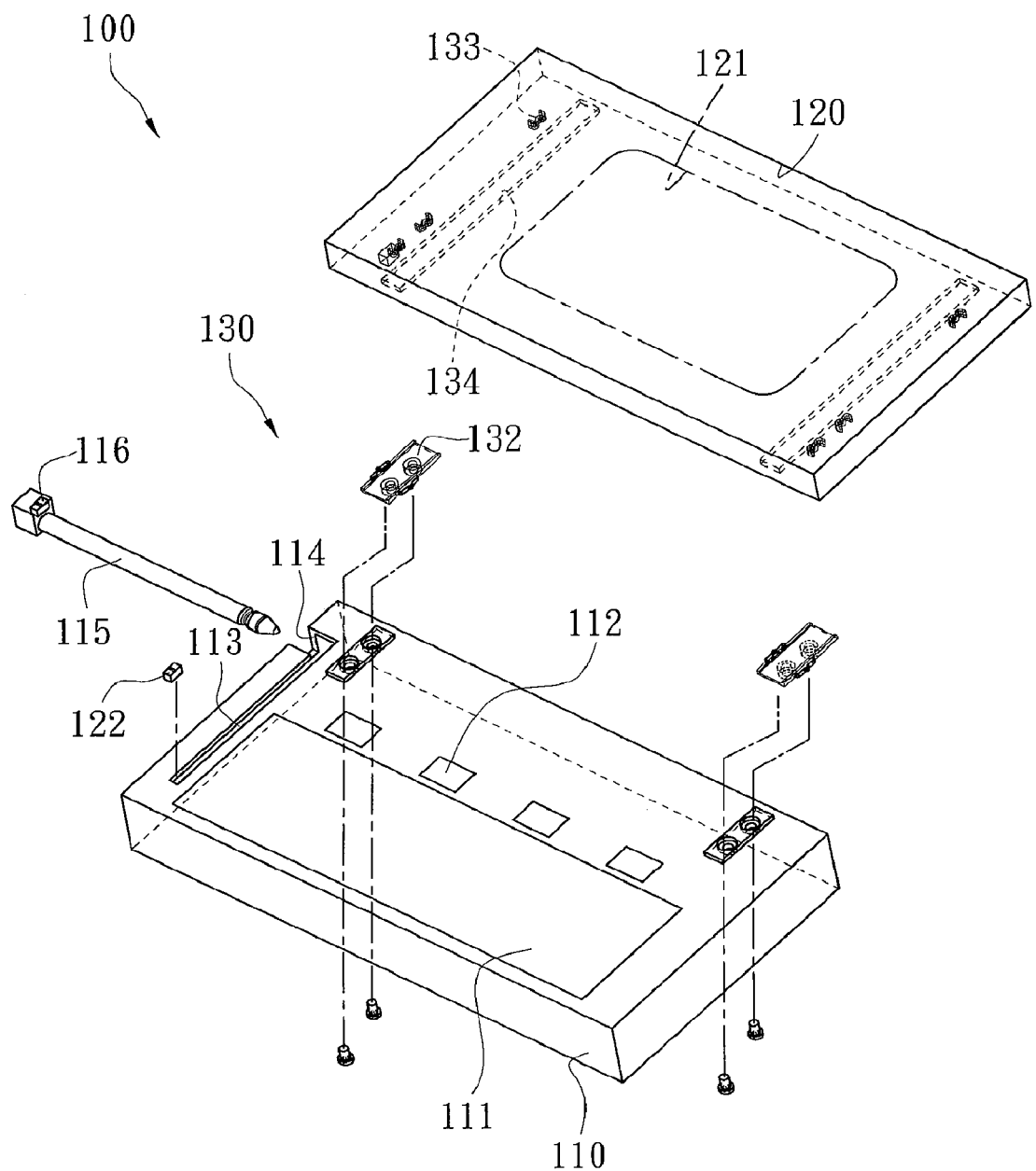
FIG. 1 is an exploded diagram showing a portable electronic device according to one embodiment of the invention.
Figure 2:
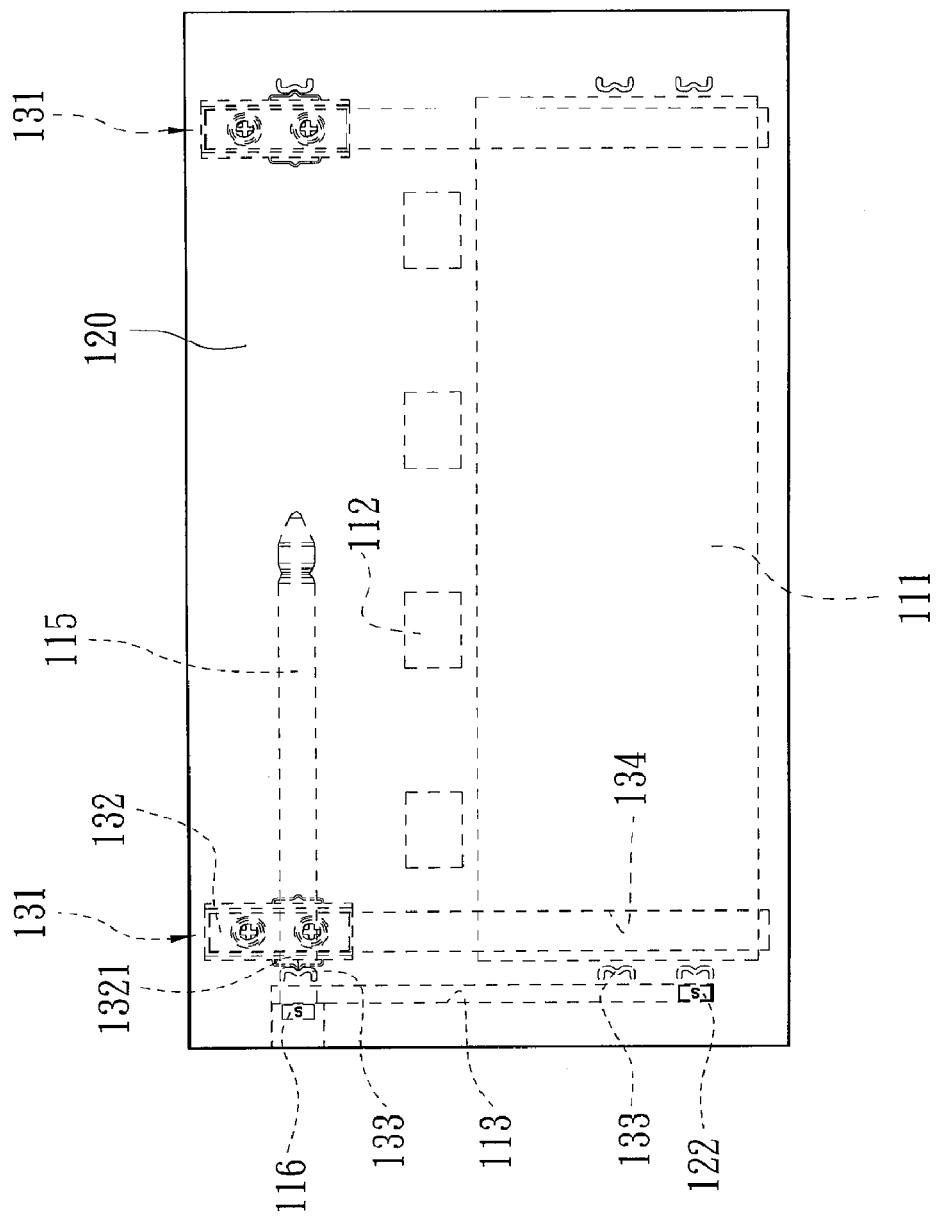
FIG. 2 is a top view showing the portable electronic device in FIG. 1 when a second body of the portable electronic device is located at a first location.
Figure 3:
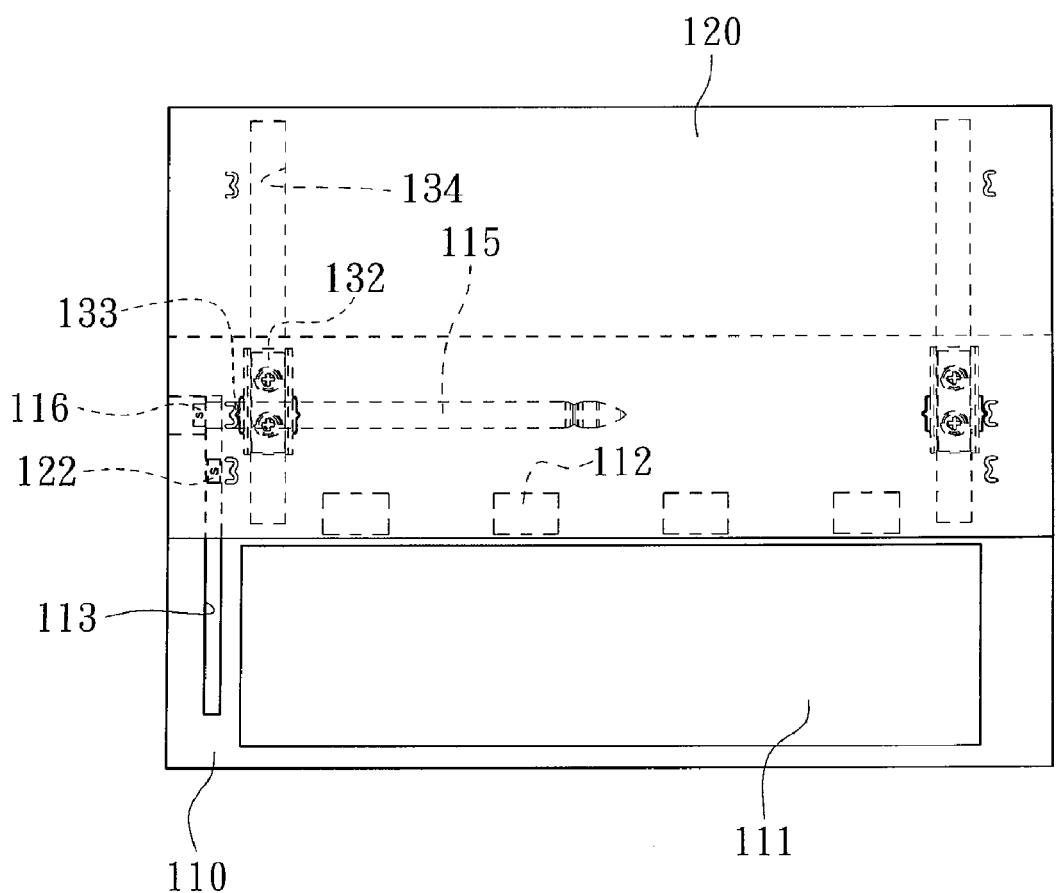
FIG. 3 is a top view showing the portable electronic device in FIG. 1 when the second body of the portable electronic device is located at a second location.
Figure 4:
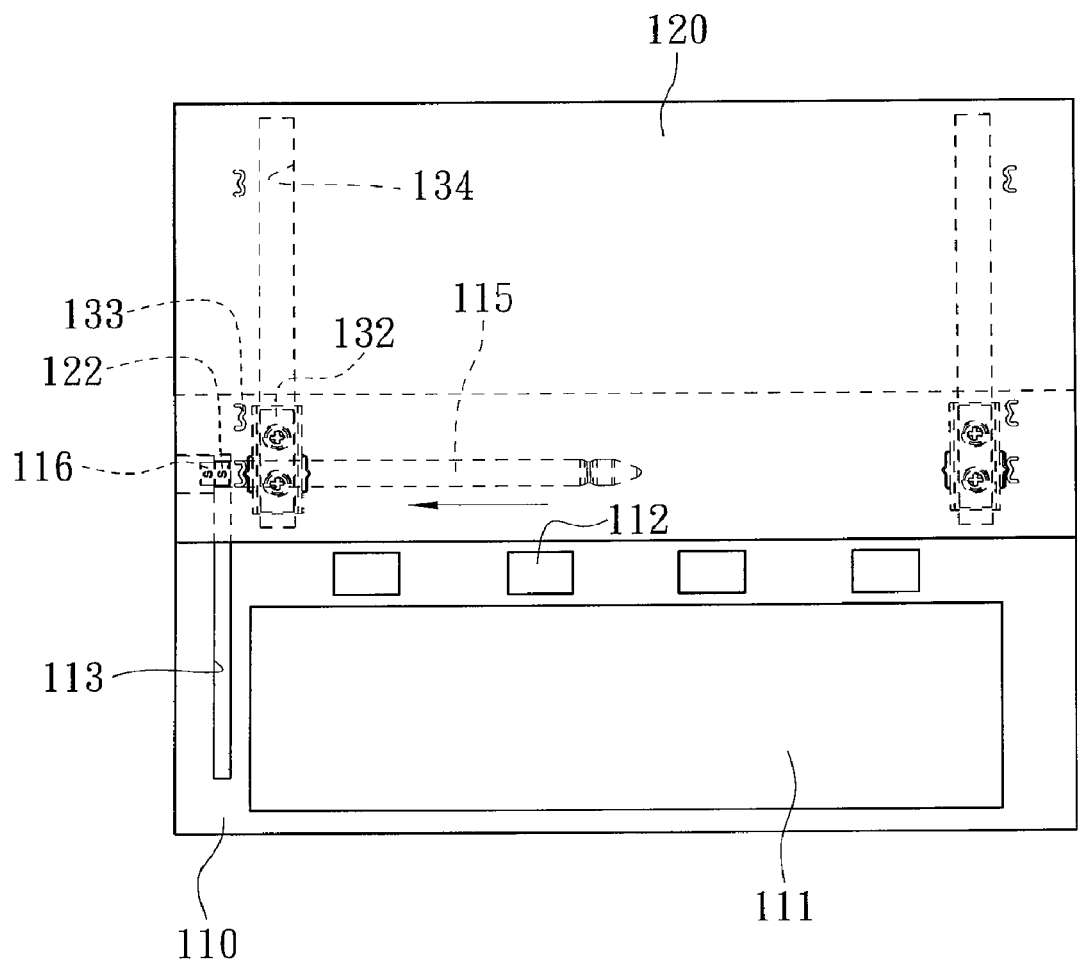
FIG. 4 is a top view showing the portable electronic device in FIG. 1 when the second body of the portable electronic device is located at a third location.

As shown in FIG. 1, in one embodiment, an electronic device 100 includes a first body 110, a second body 120 and a sliding positioning device 130. The first body 110 and the second body 120 can relatively slide via the sliding positioning device 130. The sliding positioning device 130 can position the second body 120 at a first location (as shown in FIG. 2), a second location (as shown in FIG. 3) and a third location (as shown in FIG. 4) relative to the first body 110.

The first body 110 is provided with a first operation area 111 and a second operation area 112. The first operation area 111 may be a keyboard area, and the second operation area 112 may have a plurality of hot keys. The second body 120 is provided with a display panel 121, and the display panel 121 may be a touch display panel. A first magnetic component 122 is disposed in the second body 120.

The first operation area 111 includes a plurality of keys for inputting data. Each of the second operation area 112 has a different function. When one of the second operation area 112 is pressed, the function of the second operation area 112 can be executed. The second operation area 112 are arranged side by side at one side of the first operation area 111. The first body 110 has a long guiding groove 113 and a holding hole 114. The long guiding groove 113 communicates with the holding hole 114, and it is corresponding to the first magnetic component 122. Thus, when the second body 120 is pushed to slide relatively to the first body 110, the first magnetic component 122 can move in the long guiding groove 113 along with the movement of the second body 120.

The holding hole 114 holds an operation device 115, such as a touch pen. One end of the operation device 115 is held in the holding hole 114, and the other end of the operation device 115 is provided with a second magnetic component 116. Polarities of the second magnetic component 116 and the first magnetic component 122 are the same. In the embodiment, the polarities are both s poles. When the second body 120 is located at the third location, the second magnetic component 116 and the first magnetic component 122 are opposite to each other, and repulsive magnetic force exits between the second magnetic component 116 and the first magnetic component 122.

As shown in FIG. 2, the sliding positioning device 130 is located between the first body 110 and the second body 120, and it includes two positioning structures 131. The two positioning structures 131 are disposed at two sides of the electronic device 100, respectively. The two sides of the electronic device 100 are along the sliding direction of the second body 120 relative to the first body 110.

Figure 5:
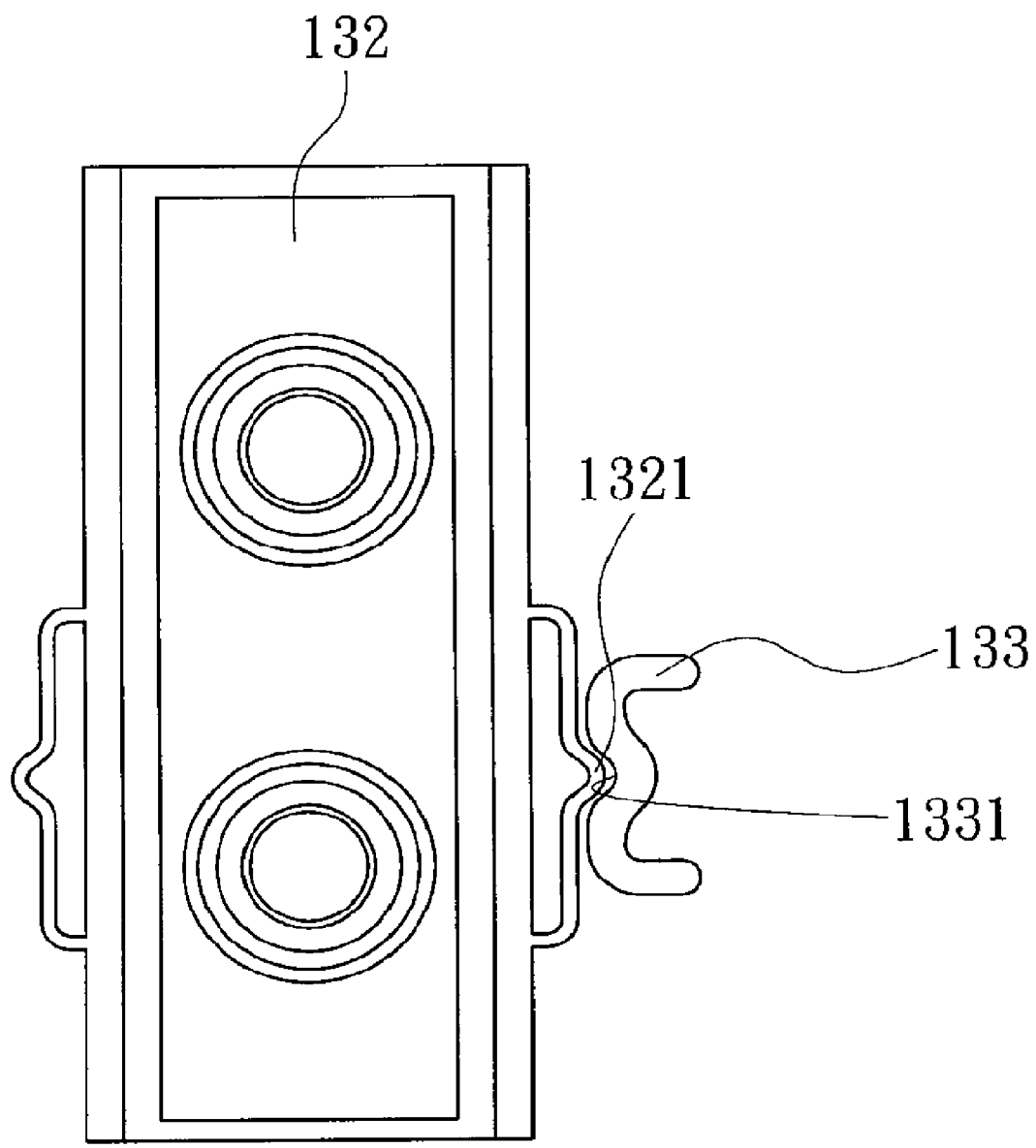
FIG. 5 is a schematic diagram showing a first positioning component and a second positioning component of a sliding positioning device of the portable electronic device in FIG. 1 when the first positioning component and the second positioning component are fastened to each other.

As shown in FIG. 5, each of the positioning structures 131 includes a first positioning component 132, a plurality of second positioning components 133 and a runner 134. The first positioning component 132 is disposed on the first body 110, and it includes a first positioning portion 1321. The number of the second positioning components 133 is three. The second positioning components 133 are disposed at one side of the second body 120, and the side of the second body 120 is opposite to the first body 110. Each of the second positioning components 133 has a second positioning portion 1331. The first positioning portion 1321 and the second positioning portion 1331 can be fastened to or separated from each other. The first positioning portion 1321 and the second positioning portion 1331 of the embodiment may be a concave portion and a convex portion which cooperate with each other. The first positioning portion 1321 may be a convex portion. The second positioning portion 1331 may be a concave portion.

The runner 134 is disposed on the second body 120, and the runner 134 and the second positioning components 133 are disposed at the same side of the second body 120. The runner 134 holds the first positioning component 132. When the second body 120 is pushed to slide relatively to the first body 110, the slide of the second body 120 is not disturbed by the first positioning component 132.

As shown in FIG. 2, when the second body 120 is located at the first location, the first body 110 is superposed at the second body 120. At that moment, the first positioning portion 1321 of the first positioning component 132 is fastened to the second positioning portion 1331 of one of second positioning components 133, and then relative locations of the first body 110 and the second body 120 are positioned. At that moment, the second body 120 hides the first operation area 111 and the second operation area 112.

As shown in FIG. 3, when the second body 120 is pushed to be away from the first location, the first positioning portion 1321 is separated from the second positioning portion 1331 fastened to the first positioning portion 1321. When the first positioning portion 1321 is fastened to the second positioning portion 1331 of the next second positioning component 133, the second body 120 can be positioned at the second location. At that moment, the first operation area 121 is exposed for input, and the second body 120 can hide the second operation area 112.

As shown in FIG. 4, if the second body 120 is further pushed to be away from the second location, the first positioning portion 1321 is separated from the second positioning portion 1331 fastened to the first positioning portion 1321. When the first positioning portion 1321 is fastened to the second positioning portion 1331 of the last second positioning component 133, the second body 120 can be positioned at the third location. At that moment, the first operation area 111 and the second operation area 112 are exposed, and the second operation area 112 can be operated.

Since the first magnetic component 122 moves along with the second body 120. The first magnetic component 122 can also move to a location opposite to the second magnetic component 116 along the long guiding groove 113 when the second body 120 slides relatively to the first body 110 to the third location. The repulsive magnetic force between the first magnetic component 122 and the second magnetic component 116 can automatically eject the operation device 115 from the holding hole 114 to help a use to use the operation device 115.

Although the present invention has been described in considerable detail with reference to certain preferred embodiments thereof, the disclosure is not for limiting the scope of the invention. Persons having ordinary skill in the art may make various modifications and changes without departing from the scope and spirit of the invention. Therefore, the scope of the appended claims should not be limited to the description of the preferred embodiments described above.

What is claimed is:

1. A portable electronic device comprising:
   a first body comprising a first operation area and a second operation area;
   a second body is slidable relative to the first body; and
   a sliding positioning device connected to the first body and the second body to position the second body at a first location, a second location and a third location relative to the first body, respectively;
   wherein the second body hides the first operation area and the second operation area when the second body is positioned at the first location, the second body hides the second operation area and exposes the first operation area when the second body is positioned at the second location, and the second body exposes the first operation area and the second operation area when the second body is positioned at the third location.

2. The portable electronic device according to claim 1, wherein the sliding positioning device comprises:
   two positioning structures, each of which comprises:
      a first positioning component disposed at the first body and comprising a first positioning portion;
      a plurality of second positioning components disposed at one side of the second body, wherein the side of the second body is opposite to the first body, and each of the second positioning components comprises a second positioning portion; and
      a runner disposed on the second body, wherein the runner and the second positioning components are located at the same side of the second body, and the runner holds the first positioning component;
         wherein the first positioning portion is separably fastened to one of the second positioning portions.

3. The portable electronic device according to claim 2, wherein the first positioning portion is a convex portion, and each of the second positioning portions is a concave portion.

4. The portable electronic device according to claim 1, wherein a display panel is disposed at the second body, and the display panel is a touch display panel.

5. The portable electronic device according to claim 1, wherein
   the first body has a long guiding groove and a holding hole;
   a first magnetic component is disposed in the second body;
   wherein the long guiding groove communicates with the holding hole and is corresponding to the first magnetic component, the long guiding groove holds the first magnetic component to allow the first magnetic component to move therein, the holding hole holds an operation device, a second magnetic component whose polarity is the same with that of the first magnetic component is disposed at one end of the operation device, and when the second body is located at the third location, the second magnetic component and the first magnetic component are opposite to each other.

6. The portable electronic device according to claim 1, wherein the portable electronic device is a personal digital assistant phone.

7. A portable electronic device comprising:
   a first body comprising a first operation area and a second operation area; and
   a second body is slidable relative to the first body, which being positioned at a plurality of locations relative to the first body and hiding the second operation area and exposing the first operation area when the second body is located at one of the locations.

8. The portable electronic device according to claim 7, further has a sliding positioning device connected to the first body and the second body to position the second body at the locations relative to the first body, respectively.

9. The portable electronic device according to claim 8, wherein the sliding positioning device comprises:
   two positioning structures, each of which comprises:
      a first positioning component disposed at the first body and comprising a first positioning portion;
      a plurality of second positioning components disposed at one side of the second body, wherein the side of the second body is opposite to the first body, and each of the second positioning components comprises a second positioning portion; and
      a runner disposed at the second body, wherein the runner and the second positioning components are located at the same side of the second body, and the runner holds the first positioning component;
         wherein the first positioning portion is separably fastened to one of the second positioning portions.

10. The portable electronic device according to claim 9, wherein the first positioning portion is a convex portion, and each of the second positioning portions is a concave portion.

11. The portable electronic device according to claim 7, wherein a display panel is disposed at the second body, and the display panel is a touch display panel.

12. The portable electronic device according to claim 7, wherein
   the first body has a long guiding groove and a holding hole;
   a first magnetic component is disposed in the second body;
   wherein the long guiding groove communicates with the holding hole and is corresponding to the first magnetic component, the long guiding groove holds the first magnetic component to allow the first magnetic component to move therein, the holding hole holds an operation device, a second magnetic component whose polarity is the same with that of the first magnetic component is disposed at one end of the operation device, and when the second body is located at one of the locations, the second magnetic component and the first magnetic component are opposite to each other.

13. The portable electronic device according to claim 7, wherein the portable electronic device is a personal digital assistant phone.

14. A portable electronic device comprising:
   a first body comprising a first operation area and a second operation area and having a holding hole;
   a second body is slidable relative to the first body, which being positioned at a plurality of locations relative to the first body and hiding the second operation area and exposing the first operation area when the second body is located at one of the locations; and
   an operation device disposed in the holding hole and being ejected from the holding hole when the second body is located at one of the locations.

15. The portable electronic device according to claim 14, further has
   a first magnetic component disposed in the second body; and
   a second magnetic component disposed in the operation device and whose polarity is the same with that of the first magnetic component, and the second magnetic component being corresponding to the first magnetic component to make the operation device be ejected when the second body is located at one of the locations.

16. The portable electronic device according to claim 14, further has a sliding positioning device connected to the first body and the second body to position the second body at the locations relative to the first body, respectively.

17. The portable electronic device according to claim 16, wherein the sliding positioning device comprises:

two positioning structures, each of which comprises:

a first positioning component disposed at the first body and comprising a first positioning portion;

a plurality of second positioning components disposed at one side of the second body, wherein the side of the second body is opposite to the first body, and each of the second positioning components comprises a second positioning portion; and a runner disposed at the second body, wherein the runner and the second positioning components are located at the same side of the second body, and the runner holds the first positioning component;

wherein the first positioning portion is separably fastened to one of the second positioning portions.

18. The portable electronic device according to claim 17, wherein the first positioning portion is a convex portion, and each of the second positioning portions is a concave portion.

19. The portable electronic device according to claim 14, wherein a display panel is disposed at the second body, and the display panel is a touch display panel.

* * * * *